(12) United States Patent
Hart

(10) Patent No.: US 8,680,574 B2
(45) Date of Patent: Mar. 25, 2014

(54) HYBRID NANOSTRUCTURE ARRAY

(75) Inventor: Anastasios John Hart, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 679 days.

(21) Appl. No.: 12/507,468

(22) Filed: Jul. 22, 2009

(65) Prior Publication Data

US 2013/0260113 A1    Oct. 3, 2013

Related U.S. Application Data

(60) Provisional application No. 61/082,622, filed on Jul. 22, 2008.

(51) Int. Cl.
*H01L 21/00*    (2006.01)

(52) U.S. Cl.
USPC ........... 257/184; 257/443; 977/742; 977/762; 977/784

(58) Field of Classification Search
USPC .................... 257/184, 443; 977/742, 762, 784
See application file for complete search history.

(56) References Cited

U.S. PATENT DOCUMENTS 7,545,051 B2 *    6/2009    Yang et al. ................. 257/784
2005/0230356 A1 *  10/2005   Empedocles et al. ............ 217/2

OTHER PUBLICATIONS

Zhong Lin Wang, et al., (2004). "Semiconducting and Piezoelectric Oxide Nanostructures Induced by Polar Surfaces." Advanced Functional Materials 2004, 14, No. 10, pp. 943-956.
Xudong Wang, et al. (2004). "Large-Scale Hexagonal-Patterned Growth of Aligned ZnO Nanorods for Nano-optoelectronics and Nanosensor Arrays." Nano Letters 2004 vol. 4, No. 3, pp. 423-426.
Y C Shu, et al. (2006). "Efficiency of Energy Conversion for a Piezoelectric Power Harvesting System." Institute of Physics Publishing, Journal of Micromechanics and Microrengineering, 16 (2006) pp. 2429-2438.
Y C Shu, et al. (2006) "Analysis of Power Output for Piezoelectric Energy Harvesting Systems." Institute of Physics Publishing, Smart Mater. Struct. 15 (2006) pp. 1499-1512.
Zhong Lin Wang, et al., (2006). "Piezoelectric Nanogenerators Based on Zinc Oxide Nanowire Arrays." www.sciencemag.org, Apr. 14, 2006, vol. 312, downloaded Oct. 18, 2007, pp. 242-246.
Xudong Wang, et al., (2007). "Direct-Current Nanogenerator Driven by Ultrasonic Waves." www.sciencemag.org, Apr. 6, 2007, vol. 316, downloaded Oct. 18, 2007, pp. 102-105.
Zhong Lin Wang (2007). "Piezoelectric Nanostructures: From Growth to Phenomena to Electric Nanogenerators." Mrs Bulletin, vol. 32, Feb. 2007; www.mrs.org/bulletin, pp. 109-116.
Christy L. Haynes, et al. (2001). "Nanosphere Lithography: A Versatile Nanofabrication Tool for Studies of Size-Dependent Nanoparticle Optics.", J. Phys. Chem. B 2001, 105, pp. 5599-5611.

* cited by examiner

*Primary Examiner* — Alexander Ghyka
(74) *Attorney, Agent, or Firm* — Reising Ethington P.C.

(57) ABSTRACT

A hybrid nanostructure array having a substrate and two types of nanostructures, including a set of first nanostructures extending from the substrate and a set of second nanostructures interspersed among the first nanostructures. The first and second nanostructures comprise structures having nanoscale proportions in two dimensions and being elongate in the third dimension. For example, the nanostructures can be nanotubes, nanowires, nanorods, nanocolumns, and/or nanofibers. Also disclosed is a hybrid nanoparticle array using two different types of nanoparticles that have all three dimensions in the nanoscale. The two types of nanostructures or nanoparticles can vary in composition, shape, or size.

13 Claims, 8 Drawing Sheets

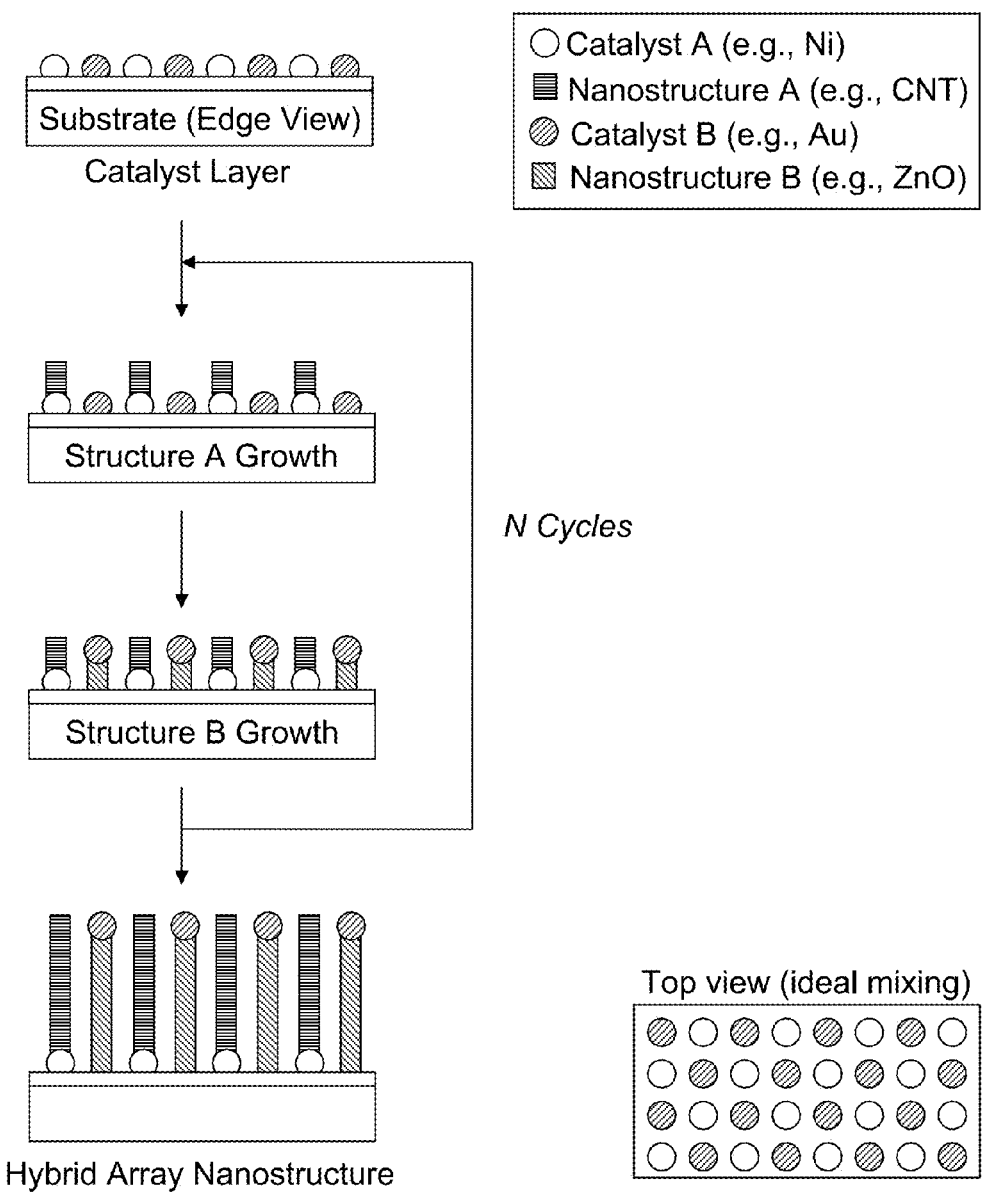
*Figure 1a*      *Figure 1b*

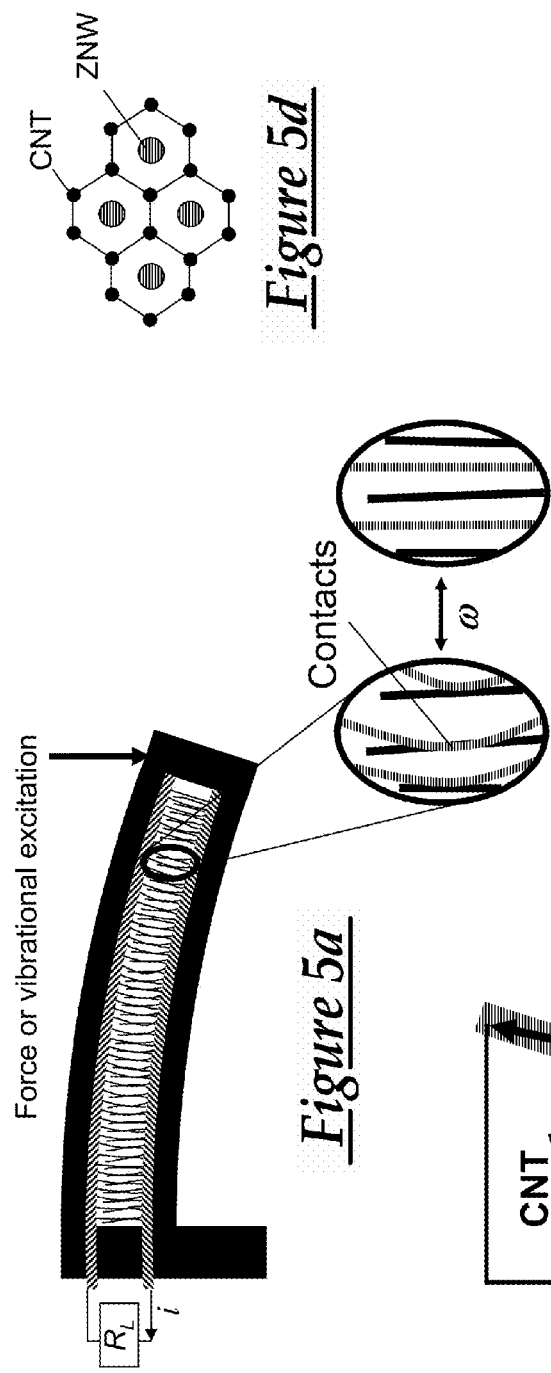
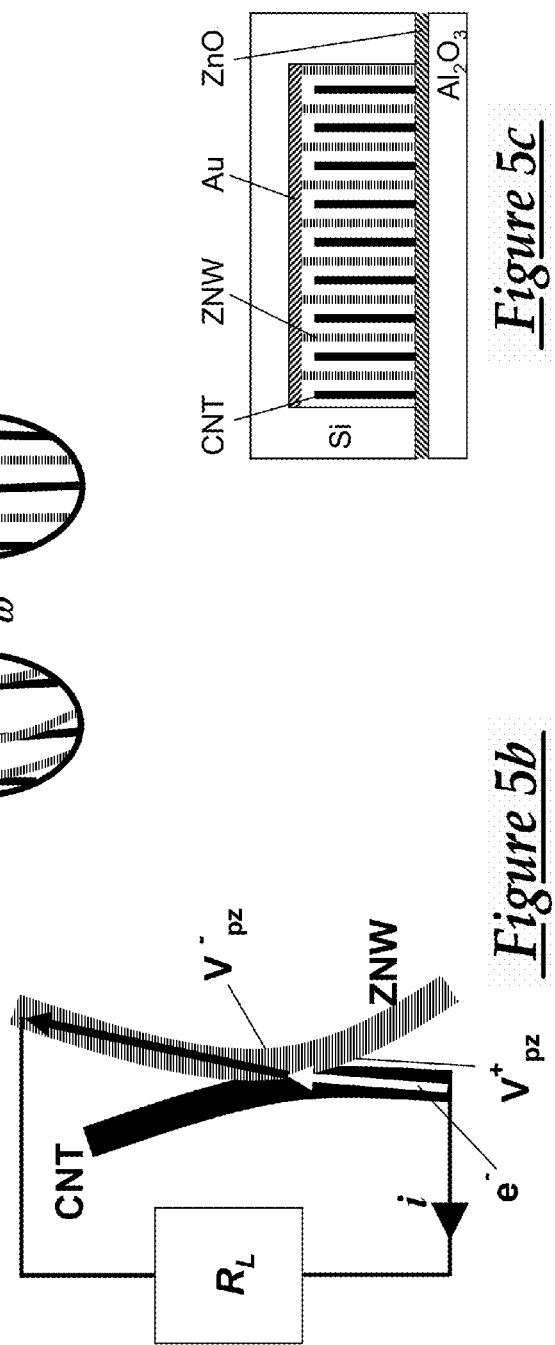
Figure 5a
Figure 5b
Figure 5c
Figure 5d

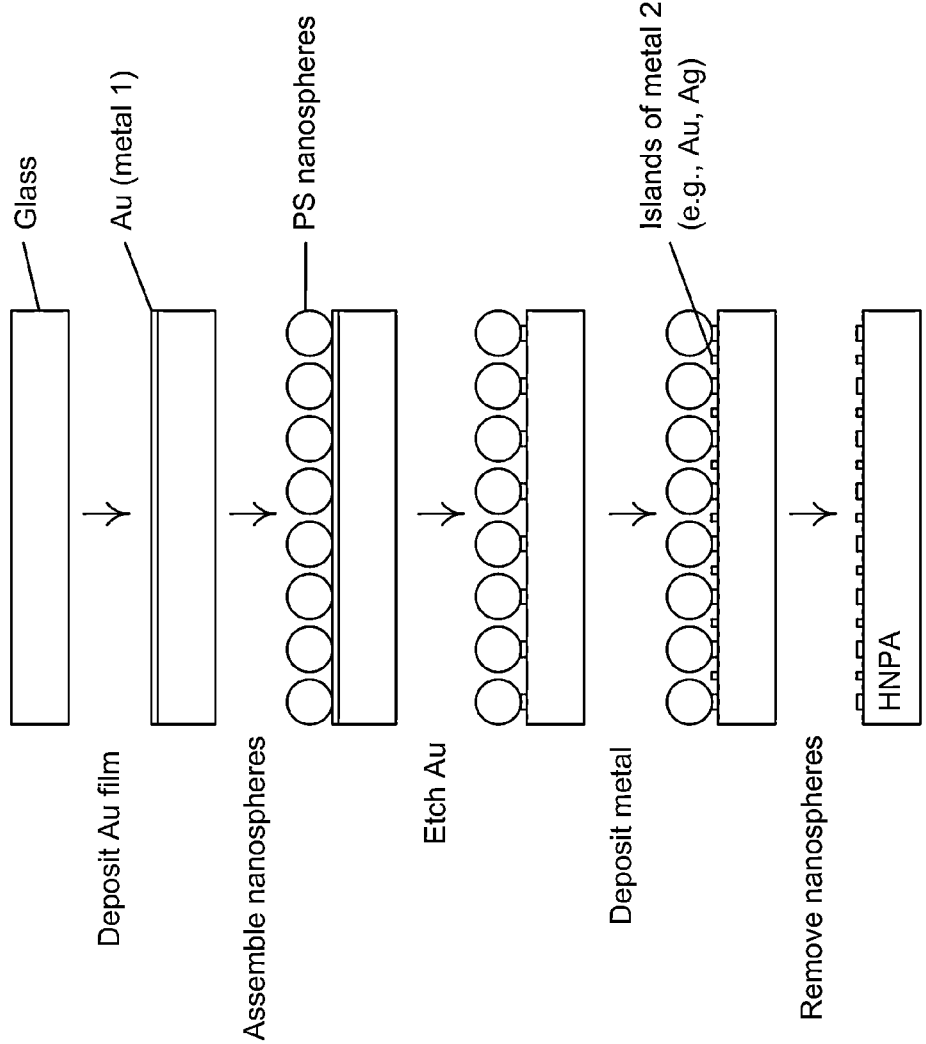
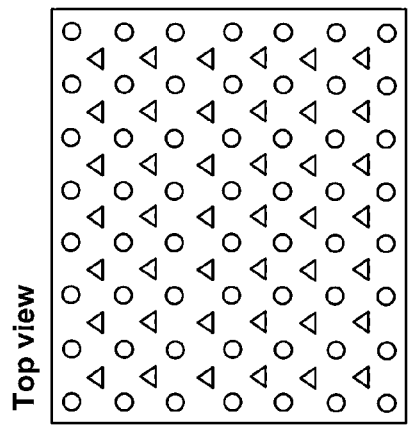
*Figure 7a*
*Figure 7b*

HYBRID NANOSTRUCTURE ARRAY

CROSS-REFERENCE TO RELATED APPLICATION

This application claims the benefit of U.S. Provisional Application No. 61/082,622, filed Jul. 22, 2008, the entire contents of which are hereby incorporated by reference.

TECHNICAL FIELD

This invention relates generally to nanostructures and, in particular, to elongate nanostructures such as nanotubes and nanowires.

BACKGROUND OF THE INVENTION

Owing to their exceptional properties and diverse capabilities for chemical functionalization and hierarchical materials integration, nanostructures are sought for a myriad of applications ranging from electronic devices to structural composites. These nanostructures include single- and multi-wall carbon nanotubes, semiconducting, metal, and oxide nanowires, and various superlattice and branched heterostructures.

For high-performance energy conversion and storage (e.g., photoelectric, electromechanical, electrochemical), energy carriers must be generated and transported at high efficiency and high density. Engineering of nanostructures to efficiently generate carriers upon a desired excitation (e.g., mechanical, optical, thermal), along with organization of nanostructures to enable efficient transport is an extremely promising approach in this regard. For example, an individual silicon nanowire consisting of a p-type core and a n-type shell generates a photoelectric current, and nanowire arrays can be configured as piezoelectric energy harvesters or dye-sensitized solar cells (Tian et al., *Nature* 449:885, 2007; Wang and Song, *Science* 312:242, 2006; Law et al., *Nature Mater.* 4:455, 2005). The high surface-to-volume ratios of nanostructures impart high sensitivity to adsorbed charges and molecular species, as exploited by resistive and capacitive chemical sensors using tangled CNT networks, batteries using oxide nanotubes, and mass sensors using functionalized thin-film cantilevers. Overall, large numbers of nanoscale junctions and interfaces enable integrated and efficient energy conversion storage in small-scale devices.

The piezoelectric properties of zinc oxide nanowires (ZNWs) have recently been demonstrated, along with extraction of electrical power from mechanical deformation induced by deflecting individual ZNWs or by coupling a ZNW array to ultrasonic excitation (Wang and Song, supra; Wang et al., *Science* 316:102-5, 2007; and related publications). In these previous devices, the ZNWs are actuated by external contact using a metal-coated AFM tip or a zigzag-etched top electrode. As the actuator strains a nanowire by deflecting the tip, a piezoelectric voltage is generated in the nanowire. Discharge occurs when the actuator contacts the negative-potential side of the nanowire. The requirement for external actuation can be a significant drawback, because it can limit the density of nanowires (spaced according to the electrode topography) and the number of contacts per nanowire (only one at the tip). Additionally, assembly of the top electrode can be difficult, as it must move in a cyclic fashion against the tips of the nanowires.

Scalable manufacturing of energy conversion devices demands both engineering of individual nanostructures (e.g., size, composition, crystal structure), and organized assembly (e.g., alignment, spacing) and addressing of large numbers ($>10^9/cm^2$) of nanostructures. While progress is being made on both fronts, the ability to engineer individual structures far outpaces the ability to assemble structures in a hierarchical or directed fashion.

Microsystems are vital technologies for military reconnaissance, security, and warfighter performance. These include chemical and inertial sensors, high-performance electronics and RF devices (e.g., tracking/locating tags, resonators, antennas), and implantable/wearable biosensors. Integrated energy harvesting and storage capabilities may be useful for long-term, remote, and self-powered operation of these devices. Considering limitations of state-of-the art nanomanufacturing techniques, a need exists to advance capability for new nanomaterial architectures for energy harvesting and storage in MEMS/NEMS devices.

SUMMARY OF THE INVENTION

In accordance with one aspect of the invention, there is provided a hybrid nanostructure array comprising a substrate, a set of first nanostructures extending from the substrate, and a set of second nanostructures interspersed among the first nanostructures. The first and second nanostructures comprise structures having nanoscale proportions in two dimensions and being elongate in the third dimension. For example, the nanostructures can be nanotubes, nanowires, nanorods, nanocolumns, and/or nanofibers. The first nanostructures have a composition or shape that is different than said second nanostructures.

In accordance with another aspect of the invention, there is provided a hybrid nanoparticle array that can be similar to that of the hybrid nanostructure array except that it uses nanoparticles having nanoscale proportions in all three dimensions. That is, it includes on a substrate a set of first nanoparticles and a set of second nanoparticles that are interspersed among the first nanoparticles. The first nanoparticles can have a composition, shape, or size that is different than the second nanoparticles.

In accordance with yet another aspect of the invention, there is provided a method of forming a hybrid nanostructure, comprising the steps of (a) forming a first set of nanostructures extending upwardly from a surface of a base substrate such that adjacent ones of the first set of nanostructures have vertically-extending interstitial spaces therebetween, and thereafter (b) forming a second set of nanostructures positioned in the interstitial spaces between the nanostructures of said first set.

BRIEF DESCRIPTION OF THE DRAWINGS

Preferred exemplary embodiments of the invention will hereinafter be described in conjunction with the appended drawings, wherein like designations denote like elements, and wherein:

FIG. 1a illustrates a hybrid nanostructure and stepwise growth process;

FIG. 1b is a top view of the nanoparticle catalyst layer of FIG. 1a;

FIGS. 5a-5d together comprise FIG. 5 which illustrates an example of energy harvesting using a hybrid nanostructure;

FIG. 7a is a diagram of a hybrid nanoparticle array that can be used, for example, for catalyst seeding of a substrate, and depicts the steps used to form the nanoparticle array; and FIG. 7b is a top diagrammatic view of the hybrid nanoparticle array constructed according to the process of FIG. 7a.

DETAILED DESCRIPTION OF THE PREFERRED EMBODIMENTS

Figure 2A:
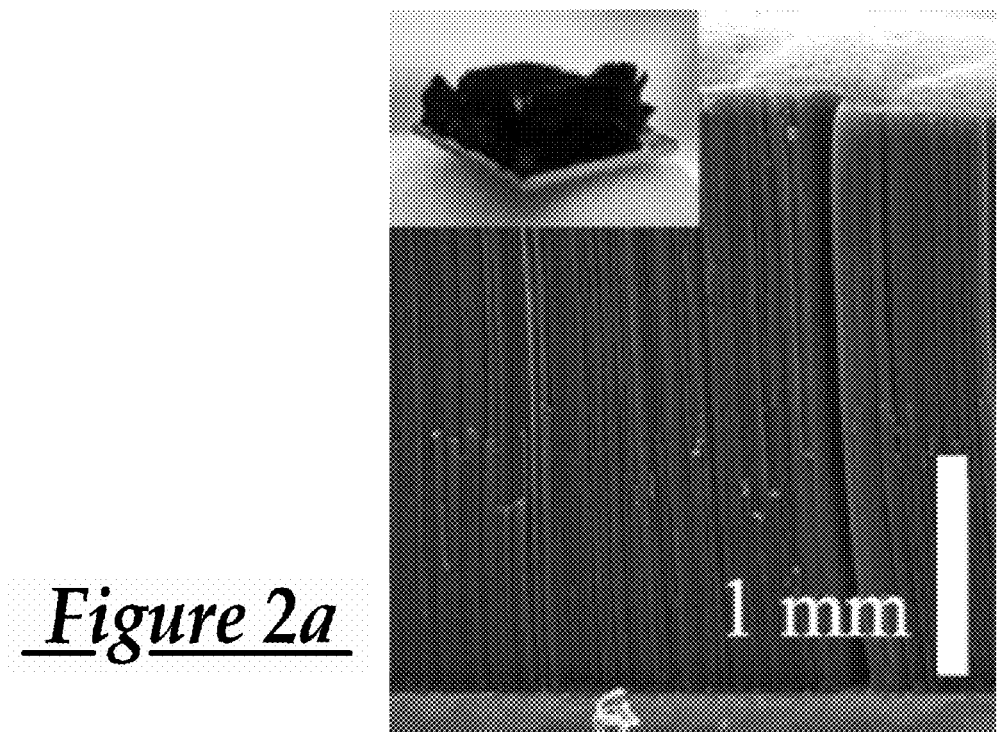
FIGS. 2a-2d illustrate examples of vertically-aligned carbon nanotubes (CNTs)
Figure 2B:
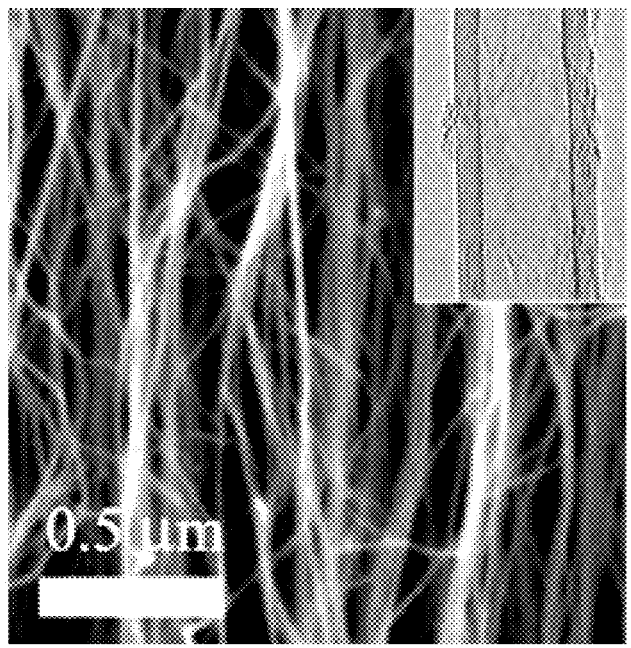
Figure 2C:
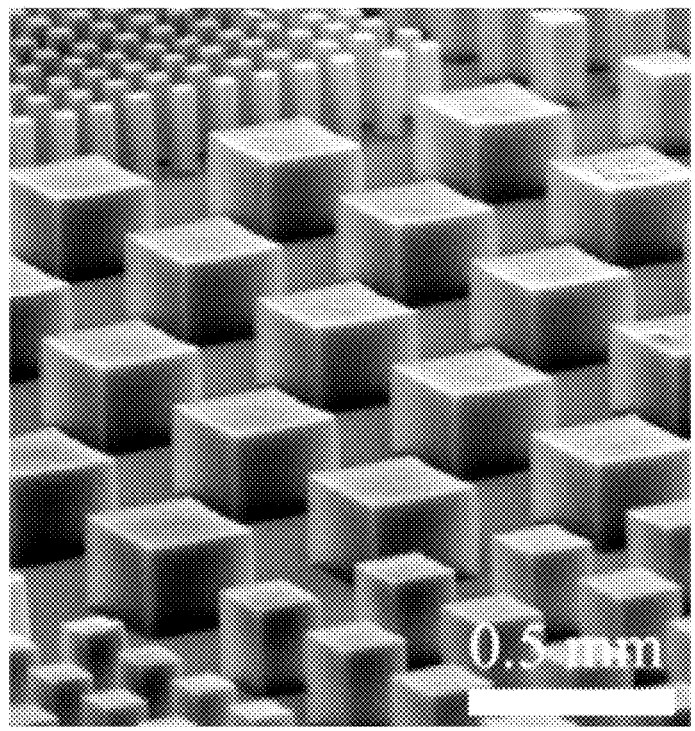
Figure 2D:
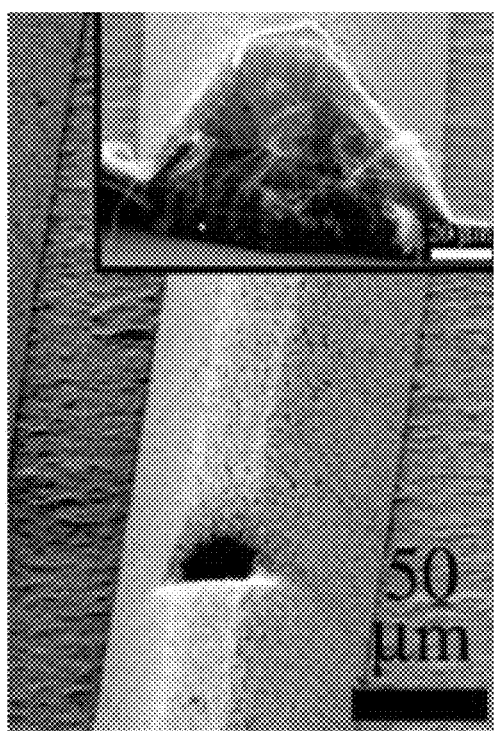

FIG. 1 illustrates a hybrid nanostructure according to one embodiment of the present invention. The hybrid nanostructure is generally comprised of a substrate and two sets of nanostructures. A first set of nanostructures, shown as Structure A in FIG. 1, extend upwardly from the substrate. A second set of nanostructures, shown as Structure B in FIG. 1, is interspersed among the first nanostructures. As indicated in FIG. 1, the second set of nanostructures may also extend upwardly from the substrate. The first nanostructures are constructed from a material composition that is different from the second nanostructures. The first nanostructures may be generally vertically aligned with the second nanostructures, as shown.

Nanostructures of the type contemplated herein are structures having two dimensions in the nanoscale; for example, elongate structures having a diameter or plural cross-sectional dimensions within the general range of 0.1 to 100 nanometers. This includes, for example, nanotubes, nanowires, nanorods, nanocolumns, and nanofibers. Nanoparticles are particles having their largest dimension on the nanoscale (i.e., having all three Cartesian dimensions in the nanoscale). An example of nanoparticles are the catalyst particles in FIG. 1, shown as generally spherical particles for purposes of illustration.

Among the many types of nanotubes and nanowires, choice of materials for the hybrid nanostructure is subject to a number of considerations and constraints, including: suitability of the materials for the desired energy harvesting or storage application; compatibility of the respective growth processes to facilitate simultaneous or sequential growth within a hybrid array nanostructure; and compatibility of the nanostructures and related processing conditions (e.g., temperature, catalyst, precursors) with the fabrication process for the surrounding device. Exemplary properties and fabrication characteristics of selected nanotubes (NT) and nanowires (NW) are listed in Table I. Other abbreviations in Table I are as follows: M (metallic), SC (semi-conducting), I (electrically insulating), PZ (piezoelectric), and TC (thermal conductor). These abbreviations indicate some of the properties a particular material and nanostructure combination can display.

TABLE I

| Structure | Properties | Substrate | Catalyst | Growth Temp. (° C.) |
|---|---|---|---|---|
| CNT | M/SC, TC | Si, SiO$_2$, Al$_2$O$_3$, MgO$_2$, TiN, others | Fe, Ni, Co, Pd, Cu, others alloys | 300-1200 |
| BN NT | I, TC | Al$_2$O$_3$, SiO$_2$ | NiB, Fe | 600-1500 |
| Si, Ge NW | SC | Si, SiO$_2$, Ge, Al$_2$O$_3$ | Au, Ga, Ag, Cu, Pt, Ti | 350-1000 |
| InGaAs NW | SC | GaAs, InP | Au (if needed) | 400-750 |
| CdSe NW | SC | Si, HOPG | Au (if needed) | 650-1000 |
| ZnO NW | SC, PZ | Si, Al$_2$O$_3$, GaN, Al, Pt | Au, Sn, Ag | 700-1000 |
| GaN NW | SC | Si | Au, Ni, Fe, In, Ga | 850-1000 |

In the exemplary embodiment shown in FIG. 1, the first nanostructures are carbon nanotubes (CNTs) and the second nanostructures are zinc oxide nanowires (ZNWs or ZnO NWs). Due to their seamless sp$^2$-bonded structure, individual CNTs can exhibit high stiffness ($\approx$1 TPa) and strength ($\approx$50 GPa), exceptional thermal conductivity (1500-3500 W/m-K) and current-carrying capacity (>10$^9$ A/cm$^2$), along with room-temperature ballistic electron transport at micron-scales. Single-wall CNTs (SWNTs) have 0.3-4 nm diameter and can be metallic or semi-conducting depending on their chirality, while multi-wall CNTs (MWNTs, 3-100 nm diameter) are typically metallic due to the inverse relationship between band gap and diameter. Due to their metallic character and relative ease of fabrication, MWNTs are more readily sought to replace copper in next-generation microelectronic interconnects. ZnO is both semiconducting and piezoelectric, and can be grown in many nanostructured forms, including nanowires, belts, rings, and helices. ZnO has a tetrahedrally-coordinated (Wurtzite) crystal structure, in which alternating planes of Zn$^{2+}$ and O$^{2-}$ are stacked. The native charge of these planes favors growth of ZnO in the <0001> direction, and control of this polar driving force enables growth of ZnO nanostructures in the forms listed above. As a semi-conductor, ZnO exhibits a relatively wide direct band gap of 3.37 eV, and a large exciton binding energy of 60 meV. As a piezoelectric, a strain-induced displacement of the ions within the ZnO lattice creates a voltage, and the value of the piezoelectric coefficient depends on the direction of strain.

This particular combination of materials is useful because the CNTs are electrically conductive and the ZNWs exhibit the piezoelectric effect when deformed from a relaxed state; i.e., they generate an electrical voltage when deformed. This combination of material constructions is useful in a variety of applications which will be further described herein. Of course, in other similar embodiments the first nanostructures can comprise any material that is electrically conductive and the second nanostructures can comprise any material that exhibits a piezoelectric effect to achieve the same advantages of the CNT and ZNW combination. Other embodiments can use combinations of material constructions having various material properties which may or may not include electricity generation or conduction. For example, semi-conducting nanostructures, thermally conductive nanostructures, or electrically insulating nanostructures may be combined with one another or with piezoelectric or electrically conductive nanostructures in a hybrid nanostructure.

In one embodiment, the hybrid nanostructure includes a lower substrate and an upper substrate that is generally parallel with the lower substrate. In the example shown in FIG. 5, the lower substrate is shown as ZnO-coated Al$_2$O$_3$, and the upper substrate is shown as gold-coated silicon (Si). In this embodiment, the first nanostructures (shown as CNT) extend upwardly from the lower substrate, and the second nanostructures (shown as ZNW) extend downwardly from the upper substrate. As shown in this example, the second nanostructures may extend between the upper and lower substrates, contacting each of the substrates. The second nanostructures are interspersed among the first nanostructures, and preferably most or all of the second nanostructures are positioned adjacent a first nanostructure. It is also useful in this embodiment when the first nanostructures have a greater rigidity than the second nanostructures, which will be further described herein. As used herein, greater rigidity means that it requires a greater force to cause bending or deflection. Rigidity may be controlled by various means such as the cross-sectional area or diameter of a nanostructure or the material or shape of the nanostructure, for example.

One particular application of the hybrid nanostructures described herein is as a vibrational energy harvester. It may be constructed with CNTs as the first nanostructures and ZNWs as the second nanostructures to form a hybrid CNT/ZNW array nanostructure. In the hybrid array nanostructure of this embodiment, contacts can be created locally between the ZNW and CNT sidewalls. This facilitates a much higher density of nanowires and contacts, as well as integrated fabrication by hybrid array growth, micromachining, and thin film deposition. With a hybrid array nanostructure embedded in a structure such as a cantilever, as shown in FIG. 5, deformation (e.g., resonant excitation) of the structure can bend or buckle the nanostructures within the array. In the configuration shown, the ZNWs are attached to substrates at both ends and can therefore bend when the cantilever is deflected. As shown, the CNTs are attached at only one end and can remain relatively straight. Strain in the ZNWs can generate voltage by the piezoelectric effect, and subsequent contact between adjacent ZNWs and CNTs can cause current to flow into the CNTs and then into the external circuit, as illustrated in FIG. 5. Contact between the stretched side of a p-type ZNW and a CNT can create a forward-biased diode, permitting current flow into the CNT. This discharge process can be repeated in parallel for each contact and for each cycle. Further, the fundamental modes of the ZNWs themselves can be excited at higher frequencies, causing repeated contact with the CNTs without exciting the encapsulating structure. The hybrid array nanostructure geometry may be chosen to give the desired voltage and current output. By selecting the nanostructure height, complex deformation (e.g., multi-mode buckling) of the nanostructures may result in multiple reversible contacts per nanostructure.

The embodiment shown in FIG. 5 is a planar device encapsulating the hybrid array nanostructure. After array growth on the $Al_2O_3$ substrate, a conductive thin film of ZnO may be grown (by increasing the Zn vapor pressure) at the bottom of the array as the bottom electrode. Additional Au can be deposited on the ZNW tips by glancing angle sputtering, and the array may be thermally bonded to a second (Si) substrate having a KOH-etched cavity coated with Au.

Table II lists preferred values of key characteristics of this hybrid array. These preferred values are based on modeling of the mechanical properties of the nanostructures and the associated energy harvester performance. One performance assumption is the reversibility of contacts within the array. For this, the nanostructures must be locally separated in the undeformed configuration and be sufficiently rigid so elastic restoring forces overcome van der Waals forces when deformation is released. Spacing is determined by the array density. A preferred density is approximately equal to that for a CNT forest which has been observed to exhibit reversible compressibility under 20% bulk strain. CNTs have a much higher Young's Modulus than ZNWs ($E_{CNT}$=1000 GPa, $E_{ZNW}$=29 GPa). The respective diameters of the CNT and ZNW nanostructures are preferably chosen so the structures have a bending stiffness ratio of $k_{CNT}/k_{ZNW}$>10:1.

TABLE II

| CNT diameter | 20 nm |
| CNT length | 3 μm |
| CNT areal density | $2 \times 10^{10}$ |
| ZNW diameter | 40 nm |
| ZNW length | 5 μm |
| ZNW areal density | $1 \times 10^{10}$ |
| CNT:ZNW ratio | 2:1 |

Figure 4:
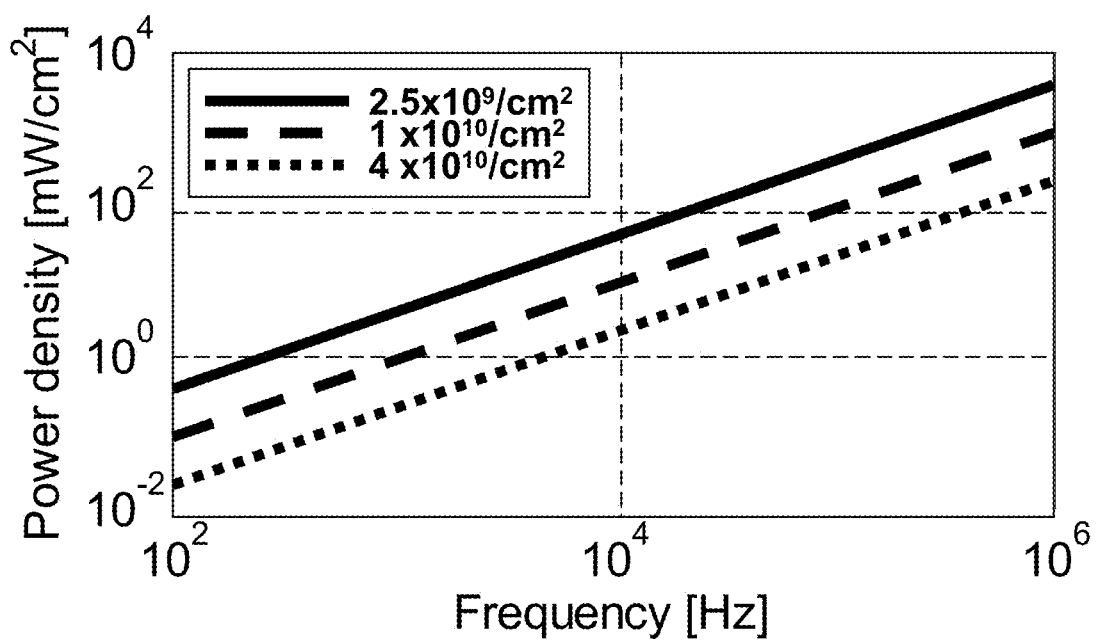
FIG. 4 is a graph depicting predicted power density of a hybrid array nanostructure versus excitation frequency.

A mathematical model of vibrational CNT/ZNW energy harvesting was built to benchmark expected performance. The piezoelectric voltage at the surface of a bent nanowire is $V_{pz}$=0.75du/Lc, for nanowire diameter d, deflection u, length L, and piezoelectric coefficient c. It is assumed that the energy per contact event is linearly related to the piezoelectric voltage, and therefore can be scaled from the value of $1.04 \times 10^{-16}$ J/event experimentally determined by Wang et al. The array power output is equal to the number of junctions in the array multiplied by the excitation frequency. The result predicts a significant improvement in power density over existing MEMS/NEMS energy technologies, as listed in Table III for frequencies corresponding to resonance of an encapsulating microstructure and plotted in FIG. 4 versus frequency for selected values of array areal density. Multi-mode buckling of nanowires enables multiple contacts along the length of each structure, and therefore each NW can have multiple discharge events per cycle. To account for random mixing of the catalyst nanoparticles and practical growth yields, the model assumes a 50% probability of CNT/ZNW contact as compared to perfect arrangement where each ZNW is isolated within a hexagonal "fence" of CNTs as shown in FIG. 5. One of many design tradeoffs is the relative population of CNTs and ZNWs. A higher CNT/ZNW ratio increases the contact probability and isolation of each ZNR, but decreases the possible number of contacts. In the modeled design, individual ZNWs (d=40 nm, L=5 μm) are predicted to resonate in first, second, and third-order modes at 4, 10, and 20 MHz, making power harvesting from RF excitation also possible. These frequencies can be increased significantly using shorter or stiffer nanowires. Overall, a higher areal density and multiple contacts per nanowire can give the significant power gain over the previously reported ZNW array.

TABLE III

| | Power density [mW/cm$^2$] | Integrability/ Scalability |
| --- | --- | --- |
| CNT/ZNW hybrid nanostructure array | 1-10 | High/High |
| ZNW array | 0.03-0.3 | Low/Moderate |
| Piezoelectric thin film | 0.001-0.05 | Moderate/High |
| Vibrational generator | 0.005-0.5 | High/Low |
| Thermoelectric film | 0.03-0.3 | Moderate/High |

A hybrid array nanostructure as disclosed herein has not been fabricated by any known method. Lower-density architectures may be possible in the prior art by templating complementary functional groups on the substrate and on the ends of the nanostructures. Also, hybrid unoriented or non-oriented films of nanostructures can be fabricated by depositing a solution of mixed nanostructures by conventional methods. These alternatives become even more challenging for high aspect ratios because the nanostructures are easily bent and entangled due to surface interactions unless they are geometrically constrained as would take place in a growing film. These alternatives are generally considered to be unable to achieve the degree of organization and order offered by the disclosed hybrid array and would likely not achieve the expected device performance and beneficial compatibility with MEMS/NEMS fabrication.

In addition to the ability of the hybrid nanostructure to function as a vibrational energy harvester by converting mechanical vibrations or deformation to electricity, such a hybrid nanostructure may also function as a displacement or pressure sensor. This is possible because as deformation of the hybrid nanostructure increases, the number of contacts within the nanostructure array increases. This decreases the electrical resistance between the electrodes, and the change in resistance may be used as an indicator of a change in position, force, or pressure and may be possible even without the use of piezoelectric materials.

The hybrid array nanostructure described herein in may have additional energy-related applications. For integrated solar cells, for example, junctions within an array of mixed p-type and n-type structures may act as charge separation sites, and the uniform texture and high junction density of the array may enable efficient charge transport to conducting nanostructures or nearby contact electrodes. For electrochemical energy storage, an interpenetrating array of electrically-isolated structures resembling nanoscale "comb fingers" could serve as an integrable and scalable battery having very small ion transport distances and low internal resistance and could also be a capacitive storage element or sensor. It is also possible that large areas of hybrid nanostructures could be integrated with layered materials such as fabrics and composites, and manufactured continuously on moving substrates.

A method of forming a hybrid nanostructure can also generally be described using FIG. 1. The method includes forming a first set of nanostructures extending upwardly from a surface of a base substrate. This step is shown in the "Structure A growth step" of FIG. 1. As indicated in the Figure, adjacent first nanostructures (shown as CNT) have vertically-extending interstitial spaces between them. In the example shown, Catalyst B is deposited on the substrate at the bottom of these interstitial spaces, and this can be done either before or after the Structure A growth step. A second set of nanostructures can then be formed and positioned in the interstitial spaces between the nanostructures of the first set. This step is shown in the Figure as "Structure B growth step." Using the techniques and equipment described herein, the two sets of structures can each be fully grown either one at a time (that is, A then B) or in alternating steps (i.e., ABABAB). Also, either or both of these steps may be repeated multiple times to control the elongate dimensions of the nanostructures. For example, in the finished "Hybrid array" in FIG. 1, the first set of nanostructures is shown as being formed having approximately the same length as the second set of nanostructures by repeating the "Structure A growth step" and the "Structure B growth step" for N number of cycles. In other examples, the "Structure B growth step" may be repeated such that the length of the second nanostructures exceeds that of the first nanostructures, resulting in a hybrid nanostructure similar to that shown in FIG. 5.

Figure 6:
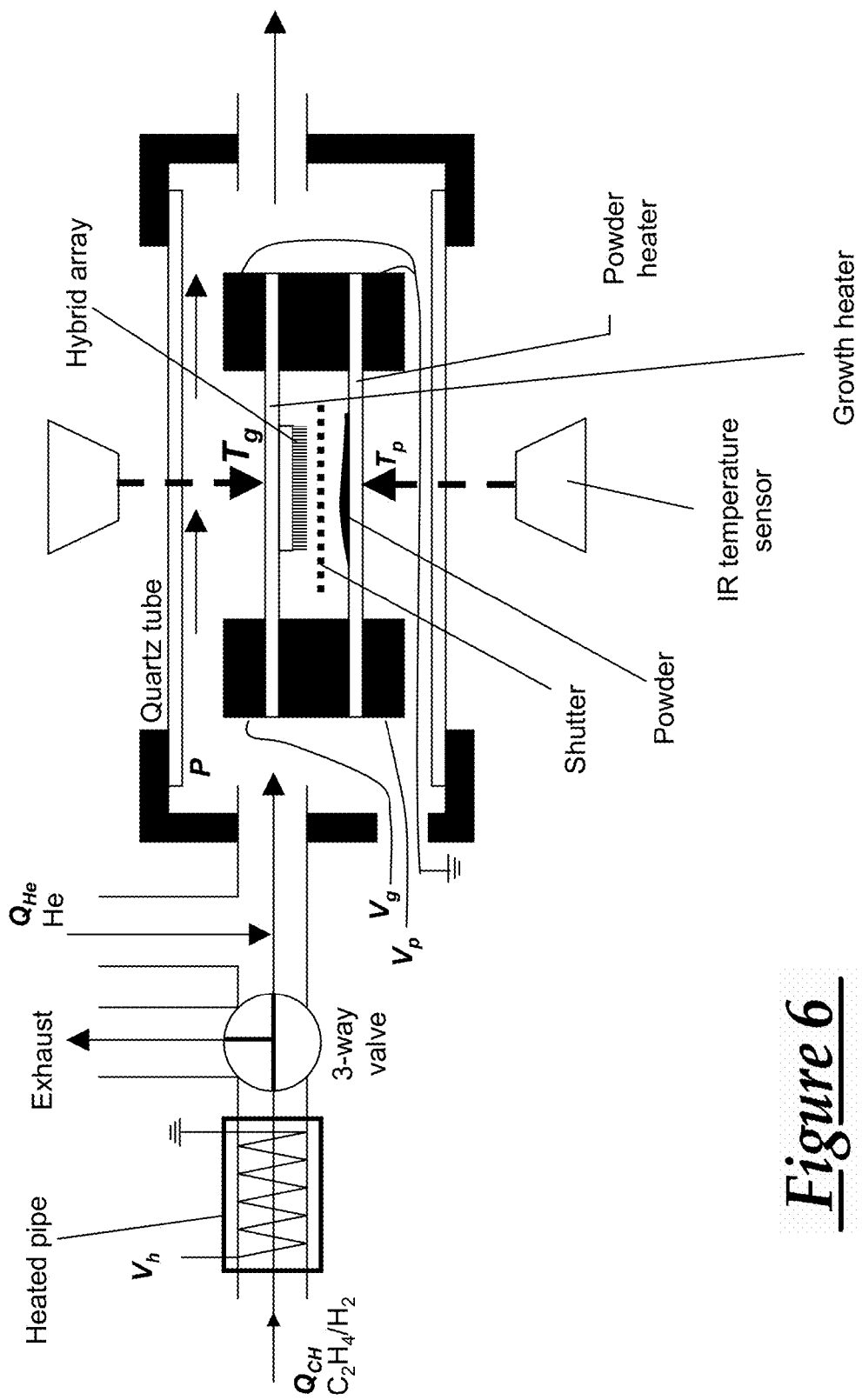
FIG. 6 is a schematic of an apparatus for chemical vapor deposition of hybrid nanostructure arrays.

Chemical vapor deposition (CVD) is a particularly useful and known technique for forming nanostructures of a particular material and structure by seeding a substrate with catalyst nanoparticles of a particular shape, size, and composition. Nanostructures of different materials and structures require different CVD processing parameters that must be precisely controlled. In order to alternate the proper processing parameters a special CVD apparatus as shown in FIG. 6 may be utilized. This apparatus and its use to form hybrid nanostructures will be described in further detail herein.

One method of seeding a substrate with catalyst nanoparticles includes stabilizing the nanoparticles with block copolymer (BCP) micelles and spin-coating or dip-coating the substrate using solutions of the stabilized nanoparticles. This technique will also be further described herein by example.

Another method of forming catalyst nanoparticles on the substrate in an alternating hybrid array is shown in FIG. 7a. First, hybrid nanoparticle arrays (HNPAs) can be fabricated by nanosphere lithography (Haynes and Van Duyne, *J. Phys. Chem. B*, 105:5599-611, 2001). For controlled growth of hybrid nanostructure arrays and for optical applications of nanoparticles (i.e., surface plasmon resonance sensors), it is advantageous to use uniformly-spaced and uniformly-sized nanoparticles. As a result, nanosphere lithography is potentially more desirable than the solution-based method of nanoparticle synthesis and deposition. A film of 10 nm thick Au can be deposited by electron beam evaporation on a glass wafer, and then polystyrene nanospheres (0.5 micron diameter, Alfa Aesar™) can be spin-cast onto the wafer. Using this method, the spheres self-assemble into a hexagonally-packed monolayer, with micron-size domains over the full wafer. Next, the Au can be etched using a wet chemical solution (e.g., $KI/I_2$ in DI water); this will remove the Au in the open spaces among the spheres, and will undercut the spheres and leave an isolated Au island under each sphere. Next, metal can be evaporated again, using the nanospheres as a shadow mask. This creates a second set of nanoparticles within the spaces among adjacent spheres. Finally, the nanospheres can be removed by soaking the substrate in acetone, and the surface can be cleaned such as by $UV/O_3$ exposure. By selecting the nanosphere size, metal film thicknesses, wet etch chemistry and time, and optional annealing after removal of the nanospheres, it is possible to create HNPAs with desired and tunable particle composition, size, and spacing. For example, depositing Au both times will give a HNPA having two sizes of Au nanoparticles; and using Au first and then Ag (or another metal) will give a uniformly mixed array two nanoparticle materials. Any suitable particle width suitable can be used; for example, using this method one can fabricate HNPAs with particle widths ranging from 10-50 nm. FIG. 7b depicts a diagram of a completed hybrid nanoparticle array, with the two types of nanoparticles being represented diagrammatically by the alternating circles and triangles, it being understood that the actual shape of one or both types of particles will be different than shown.

One method of forming the first nanostructure with interstitial spaces is by removing substrate material from a starting layer. Using this method, the areas where material has been removed become the interstitial spaces, and the remaining substrate material is in the form of spaced columns extending upwardly from the surface of the substrate revealed by the material removal. The removal of substrate material can be achieved in a variety of ways, including etching of the substrate material to the desired depth or machining of the substrate material to the desired configuration. A set of vertically-aligned nanostructures can then be grown in the interstitial spaces, forming a hybrid nanostructure array along with the remaining material. The grown material may also have two dimensions nanoscale, constituting the second set of vertically-aligned nanostructures.

One specific embodiment of this method of forming a hybrid nanostructure is described in detail below along with an apparatus that may be used to carry out the method. By way of example, the fabrication of a hybrid array nanostructure of electrically conducting multi-wall CNTs, and p-type ZNWs which exhibit both piezoelectric and semiconducting properties will be described. The hybrid array can be preferable formed by a dynamic chemical vapor deposition (CVD) process which can grows two or more types of structures simultaneously or in step-wise increments.

The nanostructures can be seeded by catalyst metal nanoparticles organized on a growth substrate. The nanotubes and nanowires identified in Table I, including CNTs and ZNWs, grow by variants of the Vapor-Liquid-Solid (VLS) mechanism. In this mechanism, a heated catalyst particle is exposed to a gaseous precursor, the precursor dissociates at the catalyst, and a supersaturated solution is formed in the catalyst. The nanostructure then precipitates or grows from the particle, and continued precursor supply and activity of the catalyst enable continued growth. Many variables govern this process, starting with the choice of catalyst and precursor, and including the catalyst-substrate interaction. For example, strong interaction prevents catalyst mobility, and catalyst-substrate interdiffusion is undesirable. Other variables governing the process are catalyst size (nanostructure diameter) and precursor pressure and temperature.

Methods of synthesis of vertically-aligned CNT "forests", such as the architectures shown in FIG. 2 are known (Hart, Slocum, *J. Phys. Chem. B* 110(16):8250-7, 2006; Hart, Slocum, *Nano Lett.* 6:1254-60, 2006). For example, starting with a Fe/$Al_2O_3$ catalyst layer deposited by e-beam evaporation on a silicon wafer, VA-CNTs can be grown by atmospheric-pressure CVD of $C_2H_4/H_2$, at substrate temperatures of 600-900° C. By engineering the catalyst pre-treatment stage, the average diameter of CNTs within the forest is tuned from 3 nm (2-3 walls) to 25 nm (22-25 walls) and, concurrently, the areal density varies from $10^{10}$-$10^{12}$ CNTs/$cm^2$. The forests can be grown rapidly (100's of μm/min) to heights exceeding 5 mm.

ZNWs are typically grown by a solid-phase sublimation CVD process, where a boat of mixed ZnO/graphite powder is placed in a tube furnace upstream of the catalyst-coated growth substrate (Wang et al., *Nano Lett.* 4:423, 2004. Song et al., *J. Phys. Chem. B* 109:9869, 2005). Upon heating, the ZnO and C powders react to sublime Zn vapor and CO. Zn is reoxidized at the catalyst, and nanowire growth proceeds. The powder is typically held at 900-950° C. at the center of the furnace, while the substrate is held at a slightly lower temperature, which is determined by the temperature gradient in the furnace. As indicated in Table I, several catalysts have been used for ZNW growth, Gold (Au) is the most common. Total gas pressure and $O_2$ partial pressure can strongly affect ZNW quality (e.g., length, density, alignment) and are can be used as control parameters for growing a hybrid array. ZNWs are naturally n-type, and p-type doping has been achieved by adding $P_2O_5$ powder to the reactant mixture. This is useful for the energy harvesting mechanism discussed previously because it is preferred that the stretched side of a ZNW creates a forward-biased diode contact with a CNT.

Fabrication of the hybrid array begins by deposition of the catalyst nanoparticles. The example CNT/ZNW array can be seeded by a mixed layer of Ni and Au particles on (0001) oriented (c-plane) sapphire ($Al_2O_3$). While many other substrates are possible, as indicated in Table I, strong catalyst-support interactions with $Al_2O_3$ enhance hydrocarbon decomposition and restrict CNT catalyst migration. For ZnO, c-plane sapphire initiates aligned growth by an epitaxial relationship as ZnO precipitates from the catalyst.

Figure 3:
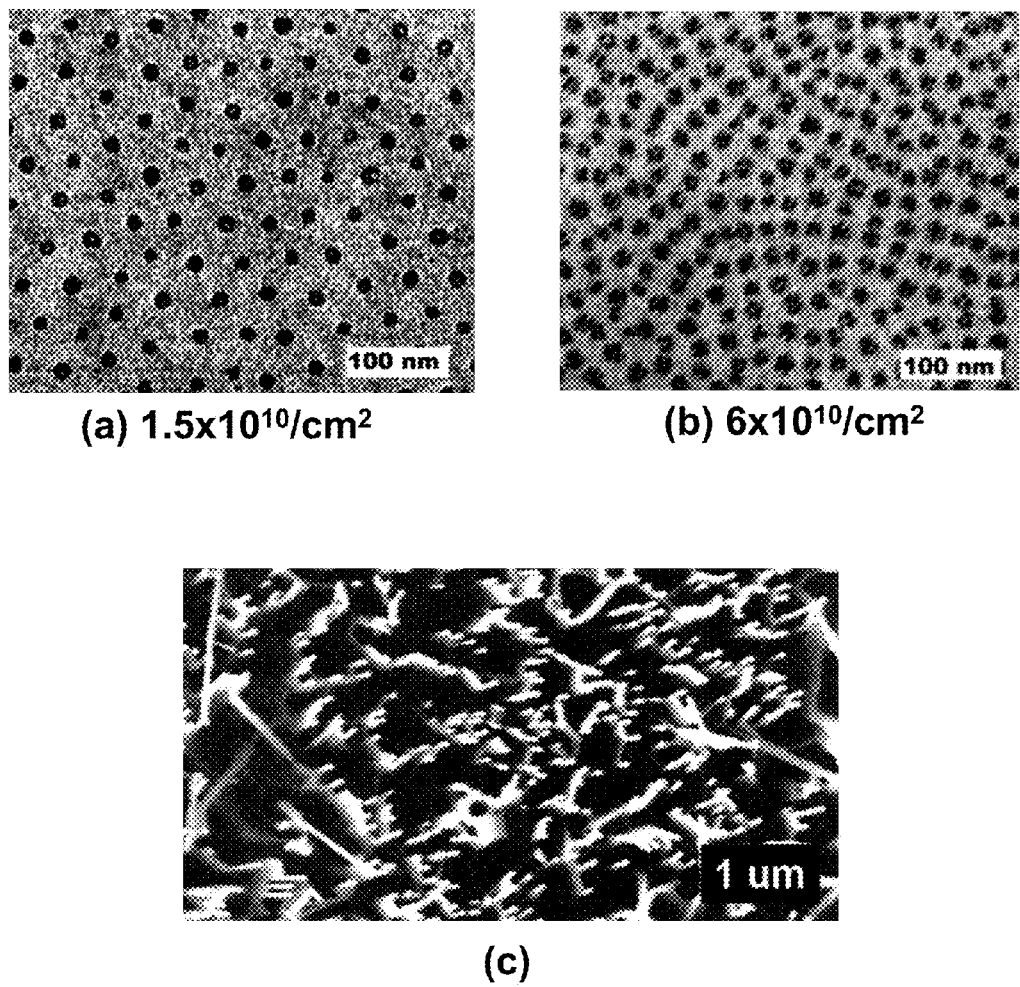
FIGS. 3a-3c illustrate examples of block copolymer (BCP) templating of catalyst arrays for growth of nanostructures, and vertically-aligned zinc oxide nanowires grown from a catalyst array.

The catalyst layer may be formed by either of the two methods noted above, or by any other suitable method that results in a hybrid array pattern of the catalyst nanoparticles on the substrate. For example, the catalyst layer may be prepared from solutions of nanoparticles stabilized by block copolymer (BCP) micelles. Each type of particle can be sequentially spin-coated or dip-coated onto the growth substrate to give the desired catalyst array composition. The polymers can be removed by $O_2$ plasma etching prior to nanostructure growth. Previous work in collaboration with Prof. Robert Cohen's group at MIT demonstrated CNT forest growth from spin-coated BCP-templated Fe nanoparticle arrays, shown in FIG. 3(a). The same system has been used to prepare Ni and Au arrays, and ZNWs have been grown from BCP-templated Au on Si (unoriented) and sapphire (vertically-aligned) as shown in FIG. 3(c) (Bennett, Hart, Cohen, *Adv. Mater.* 18:2274-9, 2006. Bennett, Ph.D. Thesis, MIT, 2007). Independent control of particle diameter and spacing was achieved, which controls CNT diameter and areal density on the substrate. Overall, the BCP technology is attractive because a wide variety of single-component and multi-component nanoparticles can be prepared, and choice of the relative metal and polymer concentrations determines the particle diameter and spacing.

The hybrid array may be grown in a novel CVD reactor apparatus, depicted in FIG. 6, that can facilitate rapid and precise control of the reaction conditions. In this reactor, the growth substrate is placed on a resistively-heated platform of highly-doped Si. The low thermal mass of the platform enables rapid heating and passive cooling at up to 100° C./s. The platform remains in full view for in situ optical observation. For CNT growth, dedicated thermal pre-treatment of the hydrocarbon gases by first passing the mixture through a "heated pipe" in the entry to the reactor generates highly active precursors. This gas-phase decomposition is a control parameter that strongly affects the CNT quality, nucleation density, and growth rate.

This reactor apparatus features dual resistively-heated platforms. A lower platform can heat a layer of powder (e.g., mixed ZnO/graphite/$P_2O_5$) placed on its surface; an upper platform can hold the catalyst-coated growth substrate; and the platform temperatures can be controlled independently using feedback from infrared temperature sensors. The growth substrate is clamped to the upper platform facing the powder source, and a shutter moves between the platforms. The apparatus can oscillate the conditions between those suitable for growth of CNTs alone and those suitable for ZNWs alone, allowing a hybrid array nanostructure to be built in alternating increments, as shown in FIG. 1. Growth of one structure entirely before the other would likely not be suitable beyond heights of approximately 1 μm because the tight spacing between the first nanostructures would complicate insertion of the second type of nanostructures after the first array has grown. A multi-zone tube furnace does not have sufficient rapid temperature control capability. The dual-platform configuration further enables rapid transport of the powder to the catalyst in a local hot zone between the platforms.

Previously, others have grown "superlattice" nanowires having composition changes along their length. For example, Si/SiGe nanowires are grown from Au catalyst by CVD of $SiCl_4/H_2$ with periodic addition of Ge introduced by pulsed laser ablation, and ZnSe/CdSe nanowires are grown by alternating atomic layer deposition (Wu et al., *Nano Lett.* 2:83, 2002. Solanki et al., *Appl. Phys. Lett.* 81:3864, 2002). These methods of switching the atmosphere are compatible with the heated platform reactor disclosed herein, making the apparatus useful for a variety of other nanostructure growth methods. However, the hybrid array is distinct in growing multiple separate nanostructured materials and in oscillating the temperature between cycles. The novel reactor apparatus and multi-component catalyst array may also be useful to facilitate growth of superlattice nanowire forests and enable fabrication of new superlattice compositions such as for thermoelectrics.

Preferred process parameters for are listed in Table IV. Other process parameters to be considered may include the heating conditions, nucleation conditions, and interval conditions (between the exemplary CNT and ZNW steps). Overall, the control capability of the dual-platform system is designed to facilitate suitable conditions for CNT/ZNW hybrid nanostructure growth and may be adapted to develop other hybrid array processes. This may include processes where both structures grow from gaseous precursors using a single heated platform, or where both structures grow from solid precursors using three platforms. Simultaneous CNT/ZNW growth may be possible using this apparatus, but the step-wise approach is preferred because it may be challenging to match growth rates of CNTs and ZNWs of the required diameters at the same temperature, while maintaining structural quality. This holds true for other types of nanostructures as well.

TABLE IV

| Parameter | CNT step | ZNW step | Transition |
|---|---|---|---|
| Substrate temp, $T_g$ | 750° C. | 850° C. | ramp |
| Powder temp, $T_p$ | — | 950° C. | ramp |
| Shutter position | closed | open | switch |
| Heated pipe temp, $T_p$ | 1020° C. | 1020° C. | (none) |
| Chamber pressure, P | 760 Torr | ~100 Torr | evacuate |
| He flow, $Q_{He}$ | 100 sccm | 25 sccm | 1000 sccm |
| $C_2H_4/H_2$ flow, $Q_{CH}$ | 100/400 sccm | to exhaust | switch valve |

The process depends upon compatibility between the two catalysts and reaction atmospheres, as both catalysts should remain independently active, and the nanoparticles should be prevented from alloying by diffusion on the substrate. For the Ni/Au-catalyzed CNT/ZNW process, Ni and Au particles will be spatially separated after one reaction cycle because Au resides at the tips of growing ZNWs (see FIG. 1). It is possible that solubility of C in Au or of Zn in Ni can poison the growth reactions. Based on phase diagrams there is a low likelihood of this complication at the low gas-phase concentrations of precursor species. But the process may require tuning, or choice of alternate catalysts. Due to the many parameters involved and the empirically-driven nature of fabrication in general, it is impossible to predict all aspects of the growth process. But the novel CVD apparatus can enable rapid and precise control of the reaction conditions to facilitate discovery of suitable growth conditions, thereby removing one of the difficulties in nanostructure growth process development. The final geometry of a hybrid array will be determined by the catalyst size and spacing, as well as activity and size evolutions during the growth process.

The energy harvester design disclosed herein uses the ZNW/top contact to permit electron flow from the ZNW (i.e., work function $\Phi_{ZNW}<\Phi_{top}$), whereas the ZNW bottom contact prohibits flow from the ZNW ($\Phi_{ZNW}>\Phi_{bot}$) such that a CNT/ZNW contact circuit is completed through the CNT. This may be achieved using a native (n-type) ZnO bottom contact deposited after hybrid array growth. Another alternative may be direct growth on a suitable metal such as Cr. The power output will depend on ZNW conductivity, which may be controllable by doping during growth. At a high carrier density, the piezoelectric charges may be screened, reducing the current output. At a low carrier density, the piezoelectric voltage may be higher and the resistance may be higher.

While compatible with most MEMS processing, the Au catalyst typically used for ZnO growth is generally not compatible with CMOS fabrication. It may therefore be desirable to seek alternative ZNW catalysts for CMOS applications and compatibility. Alternatively, the Au catalyst can be removed after growth.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A hybrid nanostructure array, comprising:
a substrate;
a set of first nanostructures extending from said substrate, wherein adjacent nanostructures of said set of first nanostructures have interstitial spaces extending therebetween and in a direction away from the substrate;
a set of second nanostructures interspersed among said first nanostructures and positioned in said interstitial spaces between said first nanostructures;
wherein said first and second nanostructures comprise structures having nanoscale proportions in two dimensions and being elongate in the third dimension; and
wherein said first nanostructures have a composition or shape that is different than said second nanostructures;
wherein said second nanostructures comprise piezoelectric nanostructures that exhibit the piezoelectric effect when deformed from a relaxed state;
wherein said first nanostructures comprise carbon nanotubes; and
wherein said piezoelectric nanostructures comprise ZnO nanowires.

2. The hybrid nanostructure array of claim 1, wherein said first and second nanostructures are generally aligned perpendicular to the substrate.

3. The hybrid nanostructure array of claim 1, wherein said first and second nanostructures extend upwardly from said substrate.

4. The hybrid nanostructure array of claim 1, wherein said first nanostructures are electrically conductive and said second nanostructures are electrically non-conductive.

5. The hybrid nanostructure array of claim 1, wherein said substrate comprises a lower substrate and wherein said hybrid nanostructure array further comprises an upper substrate extending generally parallel to said lower substrate, wherein said second nanostructures extend downwardly from said second substrate.

6. A hybrid nanostructure array, comprising:
a substrate;
a set of first nanostructures extending from said substrate, wherein adjacent nanostructures of said set of first nanostructures have interstitial spaces extending therebetween and in a direction away from the substrate;
a set of second nanostructures interspersed among said first nanostructures and positioned in said interstitial spaces between said first nanostructures;
wherein said first and second nanostructures comprise structures having nanoscale proportions in two dimensions and being elongate in the third dimension; and
wherein said first nanostructures have a composition or shape that is different than said second nanostructures;
wherein said substrate comprises a lower substrate and wherein said hybrid nanostructure array further comprises an upper substrate extending generally parallel to said lower substrate, wherein said second nanostructures extend downwardly from said second substrate; and
wherein said second nanostructures extend between said lower substrate and said upper substrate and contact each substrate such that at least most of said second nanostructures are positioned adjacent a first nanostructure.

7. The hybrid nanostructure array of claim 6, wherein said first nanostructures exhibit greater rigidity than said second nanostructures.

8. A vibrational energy harvester comprising the hybrid nanostructure array of claim 1.

9. A hybrid nanoparticle array, comprising:
a substrate;
a set of uniformly-spaced first nanoparticles located on said substrate;
a set of uniformly-spaced second nanoparticles interspersed among said first nanoparticles;
wherein said first and second nanoparticles comprise structures having nanoscale proportions in three dimensions;
wherein said first nanoparticles have a composition or shape that is different than said second nanoparticles;
wherein said first and second nanoparticles comprise catalyst particles; and
wherein the catalyst particles of one of the sets of nanoparticles are selected to reside at the tips of growing nanostructures and the catalyst particles of the other of the sets of nanoparticles are selected to reside at the substrate during nanostructure growth.

10. The hybrid nanoparticle array of claim 9, wherein said first and second nanoparticles are positioned in an alternating pattern on said substrate.

11. The hybrid nanoparticle array of claim 9, wherein the nanoparticles of said set of first nanoparticles are uniformly-sized and the nanoparticles of said set of second nanoparticles are uniformly-sized.

12. The hybrid nanostructure array of claim 1, wherein at least most of the nanostructures are not in physical contact with other nanostructures of the array when in a relaxed state.

13. The hybrid nanostructure array of claim 6, wherein said second nanostructures are attached to the upper and lower substrates at opposite ends of the second nano structures.

* * * * *